-1-506 S
5/17/87 R -E 32,373

United States Patent [19] [11] E Patent Number: Re. 32,373
Bobier [45] Reissued Date of Patent: Mar. 17, 1987

[54] FLUID DEVICE HAVING MEANS FOR ALIGNING A CYLINDER BARREL

[75] Inventor: Wilfred S. Bobier, Bloomfield Hills, Mich.

[73] Assignee: Dana Corporation, Toledo, Ohio

[21] Appl. No.: 412,879

[22] Filed: Aug. 30, 1982

Related U.S. Patent Documents

Reissue of:
[64] Patent No.: 3,868,889
Issued: Mar. 4, 1975
Appl. No.: 309,649
Filed: Nov. 27, 1972

U.S. Applications:
[60] Continuation of Ser. No. 211,418, Nov. 28, 1980, abandoned, which is a division of Ser. No. 060,333, Aug. 3, 1970, Pat. No. 3,739,691.

[51] Int. Cl.[4] ..... F01B 13/04
[52] U.S. Cl. ..... 91/506; 92/12.2
[58] Field of Search ..... 91/504–507, 91/485–488; 417/212, 248, 222; 92/12.2; 308/207 W, 207 R, 236

[56] References Cited

U.S. PATENT DOCUMENTS

| | | | |
|---|---|---|---|
| 1,187,271 | 6/1916 | Davey | 308/236 |
| 1,817,063 | 8/1931 | Carrie et al. | 91/487 |
| 1,945,391 | 1/1934 | Benedek | 91/505 |
| 2,022,290 | 11/1935 | Large | 308/236 |
| 2,098,709 | 11/1937 | Murdon et al. | 308/236 |
| 2,452,760 | 11/1948 | Jeffrey | 412/222 |
| 2,583,261 | 11/1952 | Garnier | 308/207 |
| 2,588,866 | 3/1952 | Moon | 92/12.2 |
| 2,601,830 | 6/1952 | Berlyn et al. | 91/488 |
| 2,945,449 | 2/1960 | Le Febvre et al. | 91/506 |
| 2,952,046 | 2/1960 | Budzich | 91/507 |
| 3,075,472 | 1/1963 | Garnier | 91/505 |
| 3,108,544 | 10/1963 | Pesce | 91/505 |
| 3,124,008 | 3/1964 | Firth et al. | 91/506 |
| 3,139,038 | 6/1964 | Stewart | 91/507 |
| 3,241,495 | 3/1966 | Diedrich et al. | 91/507 |
| 3,405,646 | 10/1968 | Thoma | 91/488 |
| 3,406,608 | 10/1968 | Diedrich | 91/506 |
| 3,463,087 | 8/1969 | Giant | 92/12.2 |
| 3,512,178 | 5/1970 | Russell | 417/213 |
| 3,535,984 | 10/1970 | Anderson | 91/506 |
| 3,550,223 | 12/1970 | Rubery et al. | 91/499 |
| 3,631,764 | 1/1972 | Lucien | 91/506 |
| 3,739,692 | 6/1972 | Bell | 91/506 |

FOREIGN PATENT DOCUMENTS

| | | | |
|---|---|---|---|
| 646483 | 8/1962 | Canada | 91/488 |
| 1269494 | 5/1968 | Fed. Rep. of Germany | 91/504 |
| 626259 | 10/1961 | Italy | 91/505 |
| 1073216 | 6/1967 | United Kingdom | 91/506 |

OTHER PUBLICATIONS

Abex—Denison Series 700X829 Pump (1967) as described in the Deposition of Ellis Born (Exhibits 75–78) in Civil Action No. 972547 (E. D. Mich.) now Civil Action 79–60013.

Kelsey—Hayes Pump (1969) as described in the Deposition of Clarence Smith (Exhibits 91–101) in Civil Action No. 972547 (E. D. Mich.) now Civil Action 79–60013.

*Primary Examiner*—Carlton R. Croyle
*Assistant Examiner*—Paul F. Neils
*Attorney, Agent, or Firm*—Basile, Weintraub & Hanlon

[57] ABSTRACT

A fluid device of the axial piston type having high and low pressure operating passages, one of which may be an inlet and the other an outlet depending upon the pumping or motoring function of the device. The fluid device which may be of the fixed or variable displacement type has a rotatable cylinder barrel with each end of a plurality of pistons disposed for reciprocation within cylinder bores in the cylinder barrel, and cylinder ports successively communicating each of the cylinder bores with arcuate inlet and outlet passages formed in a valving face disposed at one end of the cylinder barrel. The other ends of the pistons are drivingly engaged by an inclined thrust plate assembly disposed to impart a reciprocal stroking movement to the pistons within the cylinder bores as the cylinder barrel is rotated. In one example of the invention, the thrust plate assembly, the cylinder barrel and other rotating components of the fluid device are constructed of a sintered material enclosed in a plastic housing which is preloaded by a predetermined amount that is a function of the expansion forces exerted on the housing by the fluid pressure acting against the pistons within the cylinder bores. In a second example of the invention, a variable displacement fluid device is disclosed as having several means for varying the inclination of the thrust plate assembly with respect to the longitudinal axis of the shaft on which the rotating cylinder barrel is carried.

6 Claims, 11 Drawing Figures

Fig-10
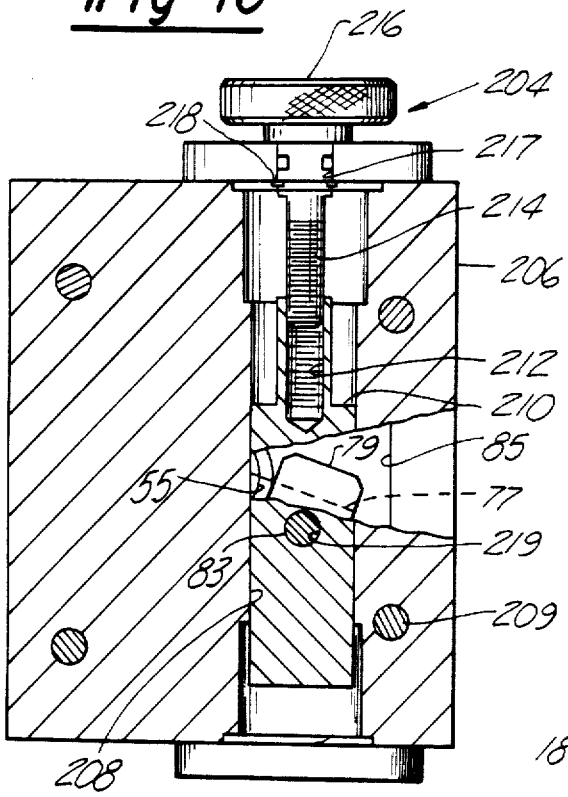
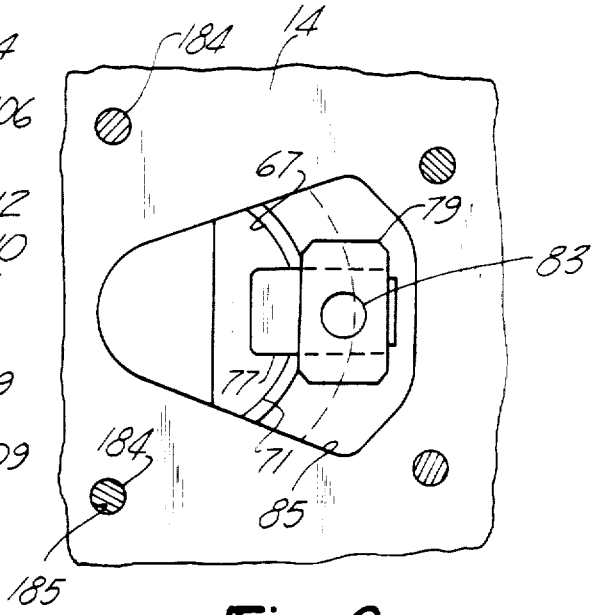
Fig-8
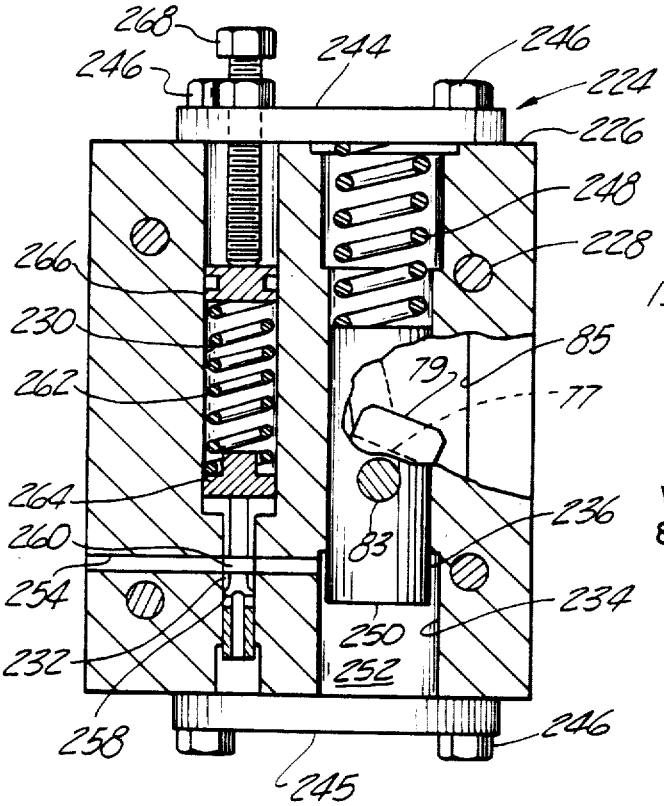
Fig-11
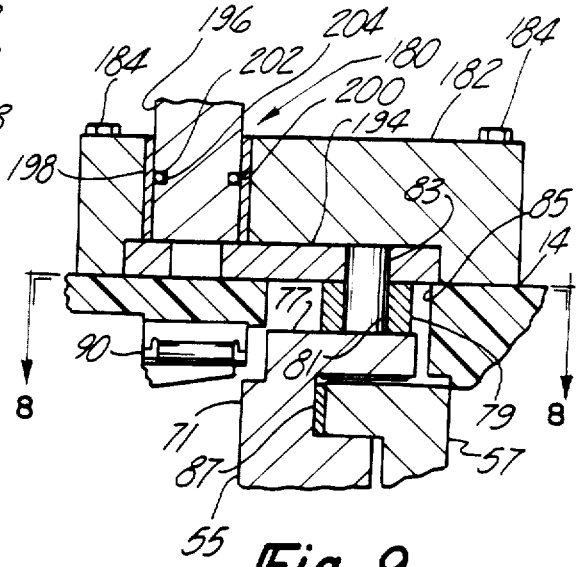
Fig-9

FLUID DEVICE HAVING MEANS FOR ALIGNING A CYLINDER BARREL

Matter enclosed in heavy brackets [ ] appears in the original patent but forms no part of this reissue specification; matter printed in italics indicates the additions made by reissue.

This is a division of co-pending U.S. Pat. Application Ser. No. 60,333 filed Aug. 3, 1970, now U.S. Pat. No. 3,739,691.

BACKGROUND OF THE INVENTION

*This application for reissue is a continuation of my co-pending application for reissue Ser. No. 211,418 filed Nov. 28, 1980, now abandoned.*

1. Field of the Invention

The present invention relates to fluid devices and particularly to those of the axial piston type which may function either as a fluid pump or as a fluid motor.

2. Description of the Prior Art

Heretofore, fluid pumping or motoring devices of the axial piston type have been constructed of a metallic housing having a revolving cylinder barrel with a plurality of parallel cylinder bores herein, within which pistons are reciprocated by means of a thrust plate assembly or the like. A rotary valve mechanism in the form of cylinder ports at one end of the cylinder barrel alternately connects each cylinder bore with an inlet and an outlet passage of the device as the cylinder barrel is rotated.

The thrust plate assembly in fluid devices of the variable displacement type normally takes the form of a yoke having transversely extending pintles rotatably carried in bearings suitably mounted to the wall of the housing such that the entire force exerted against the thrust plate assembly due to the fluid pressure acting against the piston within the cylinder barrel bores is taken by the housing, thus necessitating a strong metal housing. Such metal housings are expensive in that they must be cast molded and subsequently require a machining operation to provide the necessary precision that is needed in such constructions. It would be desirable to provide a housing for such axial piston fluid devices, constructed of a plastic material which would eliminate the subsequent machining operations and the resulting expenses normally incurred in using such metal housings. For example, housings constructed for fluid devices having the same displacement capacity would cost approximately $2.00 for a metal housing as compared to $.60 for a housing constructed of a plastic material. The equipment needed to manufacture a metal housing costs approximately $750,000.00 as compared to $3,500.00 for an injection mold which would be used in constructing a housing of a plastic material.

Further, heretofore fluid devices of the variable displacement type have used a thrust plate assembly which is normally of a metal construction such as cast iron or steel which, in addition to requiring substantial machining, adds to the overall weight of the device. It would be desirable to replace such cast iron and/or steel thrust plate assemblies with one constructed of a sintered material which, heretofore, has not been possible because of the high loads and complicated shape that such thrust plate assemblies require.

In addition to the high loads transmitted to the thrust plate assembly, suitable means must be provided which permit an easy movement of the thrust plate assembly with respect to the longitudinal axis of the drive shaft on which the cylinder barrel is rotated so as to vary the amount of reciprocal stroking movement imparted to the pistons within the cylinder bores to thereby permit a selected variation in the displacement of such axial piston fluid devices.

In such previously constructed axial piston fluid devices, the displacement control mechanism used to control the inclination of the thrust plate assembly with respect to the longitudinal axis of the drive shaft has necessitated a different design for both the fixed displacement device and the variable displacement pump as the displacement control mechanism is normally constructed as part of the housing in such variable displacement devices, thus requiring a larger housing for the variable displacement device. Heretofore, if the same housing were used for both variable and fixed displacement units, a larger housing would have been required since portions thereof would be used to mount the displacement control mechanism. The use of such a variable displacement housing in a fixed displacement unit results in an unduly large unit in proportion to its displacement. It would therefore be desirable to provide a housing which is constructed for both variable displacement and fixed displacement devices without requiring a larger housing for the variable displacement design.

It is also a conventional practice that such previously used devices have been normally constructed to use only one type of displacement varying control mechanism, whereas it may be desirable to have a fluid device having a housing construction which is adaptable for use with manual controls, pressure compensated controls and the like, thus eliminating the necessity of having several different housing designs for the same capacity unit so as to accommodate different displacement control applications.

Fluid devices of the axial piston type normally are characterized by having a valving face formed by a flat surface on which the cylinder barrel normally runs in abutment and in a fluid sealing relationship. The abutting face of the cylinder barrel on which the cylinder ports are disposed normally has been provided with arcuately spaced elevated pressure pads disposed radially outwardly from the cylinder ports providing a bearing surface on which the cylinder barrel rides in a manner which avoids excessive wear. Such bearing pads are more commonly referred to as "Kingsbury Pads" and have functioned in an acceptable manner in the past to compensate for wear and variations in oil viscosity due to changing temperatures and different fluids. In devices of this type operating at high speeds and high pressures, considerable difficulty may be experienced in providing a satisfactory running surface between the cylinder barrel and the valving face due to a lack of oil flow across the face of the cylinder barrel from the cylinder ports to the Kingsbury pads.

It would therefore be desirable to provide a new and improved Kingsbury pad for such axial piston fluid devices.

As speed and pressure is increased in such previously used fluid devices, there is always an accompanying increase in noise. This general increase in noise with increased speed and pressure may be attributed to a number of factors in devices of the axial piston type. First, the sound frequencies generated by the device increase with speed as the components of the device are subjected to increased alternating impact forces; second, the intensity of speed related sounds increases as the impact forces between components of the device increase; and third, the excitation spectrum of the significant piston harmonics also broadens, thus increasing the number of resonant responses.

It would therefore be desirable to provide a fluid device wherein the attendant noise and vibration levels are significantly reduced.

SUMMARY OF THE INVENTION

The present invention, which will be described subsequently in greater detail, comprises a fluid pumping or motoring device of the axial piston type having construction which permits the adaptation of an outer plastic housing with a substantially large percentage of the rotating parts thereof constructed of a sintered material, providing an axial piston fluid device adapted for use over a wide range of applications.

It is therefore an object of the present invention to provide a rotary fluid device of the axial piston type having an improved construction which is readily adapted to low cost manufacturing.

It is also an object of the present invention to provide a rotary fluid device of the axial piston type having an improved cylinder barrel construction resulting in a reduction in surface wear and galling between the cylinder barrel and the valving face.

It is also an object of the present invention to provide a rotary fluid device of the axial piston type having an improved thrust plate assembly resulting in greater reliability and long life while operating at high pressures and temperatures, proportioned and simplified so that it can be made inexpensively from sintered materials.

It is also an object of the present invention to provide a rotary fluid device of the axial piston type having a construction which contributes to the reduction in the general noise radiated by such a device.

It is also an object of the present invention to provide a rotary fluid device of the axial piston type having means for varying the displacement thereof, and a housing construction adaptable to accommodate a variety of displacement varying mechanisms.

Other objects, advantages, and applications of the present invention will become apparent to those skilled in the art of such fluid devices when the accompanying description is read in conjunction with the accompanying drawings.

BRIEF DESCRIPTION OF THE DRAWINGS

The description herein makes reference to the accompanying drawings wherein like reference numerals refer to like parts throughout the several views, and in which:

FIGS. 8 through 11 are fragmentary views of several modifications of the present invention.

DESCRIPTION OF THE PREFERRED EMBODIMENTS

Figure 2:
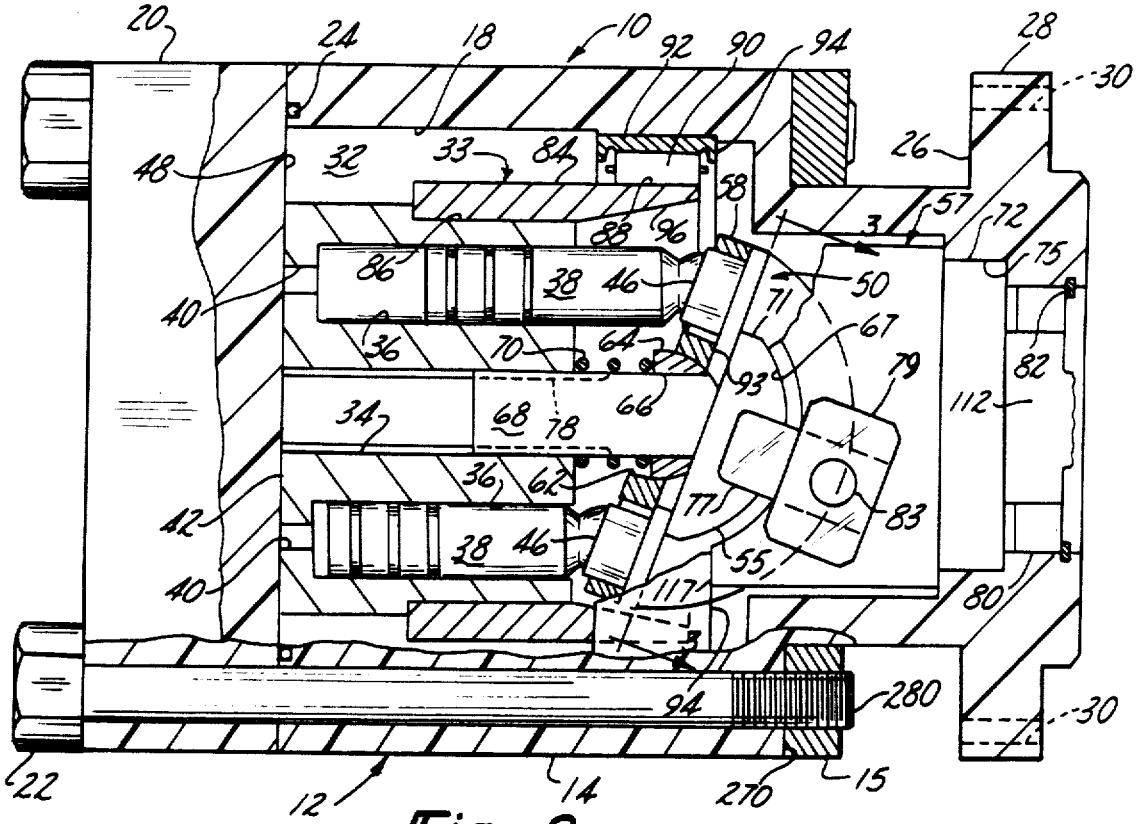
FIG. 2 is a longitudinal cross sectional view of the fluid device illustrated in FIG. 1 and taken generally on line 2—2 thereof.
Figure 1:
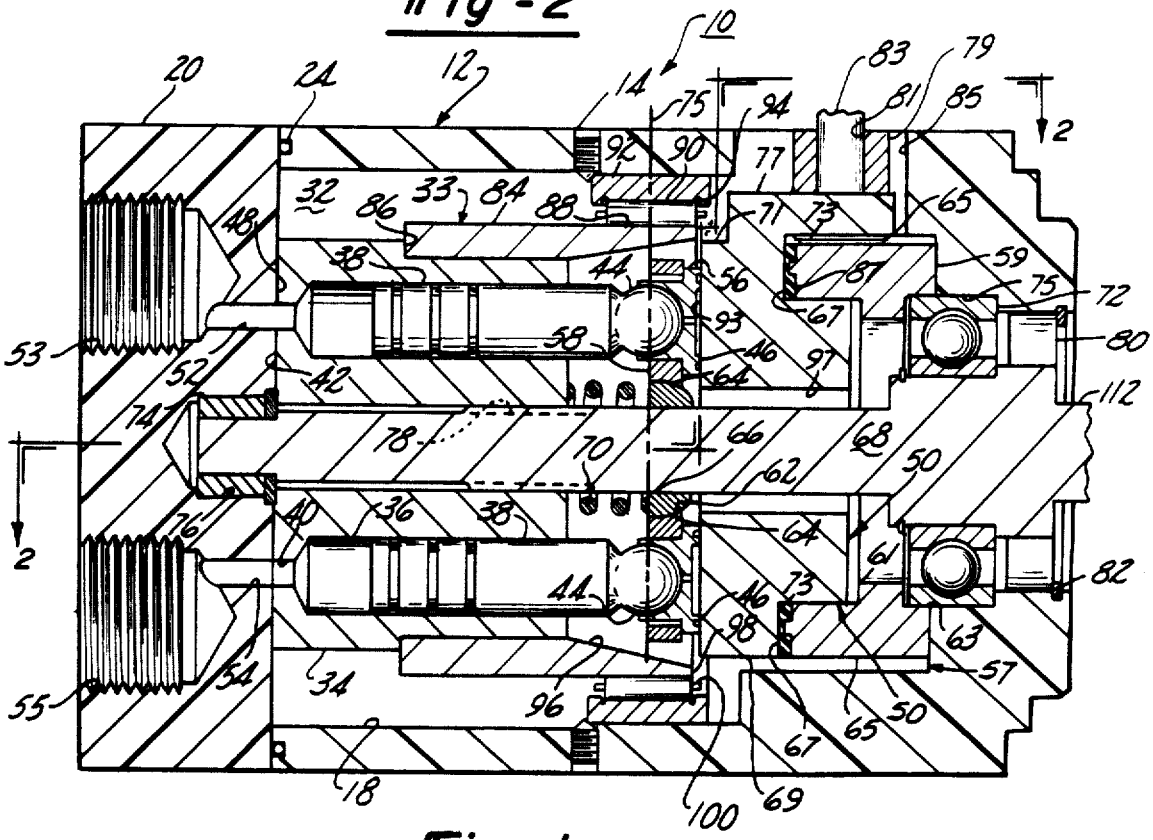
FIG. 1 is a longitudinal cross sectional view of a fluid device incorporating a feature of the present invention.
Figure 5:
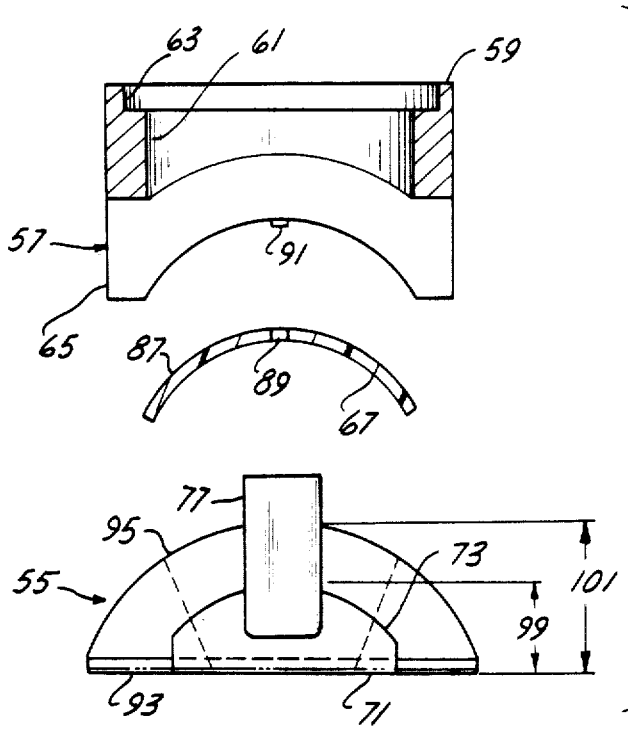
FIG. 5 is a fragmentary, exploded view of the fluid device illustrated in FIG. 1.

Referring to the drawings, and particulary FIGS. 1 and 2, there is illustrated a fluid device in the form of an axial piston pump 10 comprising a housing 12 having a body section 14 constructed of a plastic material and a longitudinally disposed bore 18 enclosed by a cap 20 secured to the body section 14 by bolts 22 extending axially through the cap 20 and the body section 14 and threadedly engaging clamps 15. An O-ring 24 insures a fluid tight seal between the juncture of the body section 14 and the cap 20. The body section 14 includes a pilot portion 26 forming a mounting flange 28 having mounting holes 30 extending therethrough to permit the mounting of the pump 10 at a desired location. The housing bore 18 provides a chamber 32 in which a rotating group 33 is positioned. The rotating group 33 includes a cylinder barrel 34 which is provided with a plurality of arcuately spaced cylinder bores 36, each having one end of a piston 38 axially slidable therein. A plurality of cylinder ports 40 axially aligned with each cylinder bore 36 communicate each of the cylinder bores 36 with a front face 42 of the cylinder barrel 34. Each of the pistons 38 have spherical ends 44 on which are swaged socketed shoes 46. The cylinder barrel 34 is positioned axially between a valving face 48 formed on the inner face of the cap 20 and an inclined thrust plate assembly 50. The valving face 48 serves in a well known manner to provide a properly phased connection between the cylinder ports 40 and a pair of arcuate ports 52 and 54 such that the cylinder ports 40 communicate successively with the arcuate ports 52 and 54 as the cylinder barrel 34 rotates. The arcuate ports 52 and 54 are, respectively, connected to the external inlet and outlet connection ports 53 and 55 of the pump 10.

The piston shoes 46 have outwardly extending flanges 56 which are contacted by an annular cage 58 with holes corresponding to each piston 38. The annular cage 58 has a centrally disposed conical bore 62 adapted to contact a spherical outer surface 64 of a collar 66 which is, in turn, carried on a drive shaft 68 that extends longitudinally through the housing bore 18. A spring 70 disposed between the piston end of the cylinder barrel 34 and the collar 66 exerts a force urging the face 42 of the cylinder barrel 34 into engagement with the valving face 48, while at the same time biases the shoes 46 by means of the collar 66 and the annular cage 58 into engagement with the thrust plate assembly 50. The drive shaft 68 is supported between bearings 72 and 74. The bearing 72 is carried in a bore 75 of a decreased diameter at the thrust plate assembly end of the housing 12 while the bearing 74 (shown only in FIG. 1) is carried in a centrally disposed bore 76 within the cap 20. The drive shaft 68 is effective to transmit torque from a prime mover (not shown) to the cylinder barrel 34 through a splined driving connection 78 in a conventional manner. A conventional shaft seal 80 is provided in the decreased diameter bore 75 and retained in position by a snap ring 82.

The cylinder barrel 34 is provided with a skirt portion 84 snuggly fitted in a recessed portion 86 at the piston end of the cylinder barrel 34 to form an inner race 88 for roller bearings 90; the outer race 92 of which is carried by the body section 14 in abutment with the thrust plate assembly in a manner which will be described in greater detail hereinafter. The skirted portion 84 has an annular inclined inner surface 96 extending upwardly from the cylinder barrel 34 and terminating in such a manner that the thrust plate assembly end 98 of the inner race 88 is flush with the thrust plate assembly end 100 of the roller bearings 90. Heretofore, fluid devices have been constructed with the inner race of the bearing extending beyond the roller bearings the same distance as the outer race. By having the end 98 of the inner race 88 flush with the end 100 of the roller bearings 90, a greater diameter of thrust plate assembly 50 with respect to the longitudinal axis is provided which may increase the displacement capacity of the pump 10 by as much as 15% as compared to fluid heretofore constructed by allowing the pistons to operate on a larger piston bore circle. The piston bore circle is a circle defined by the longitudinal axes of the pistons 38 as the same rotate about the longitudinal axis of the shaft 68. As the diameter of the piston bore circle is increased, the diameter of each piston bore 36 may likewise be increased, thus the displacement of the pump 10 may be increased without increasing the overall size thereof.

Figure 7:
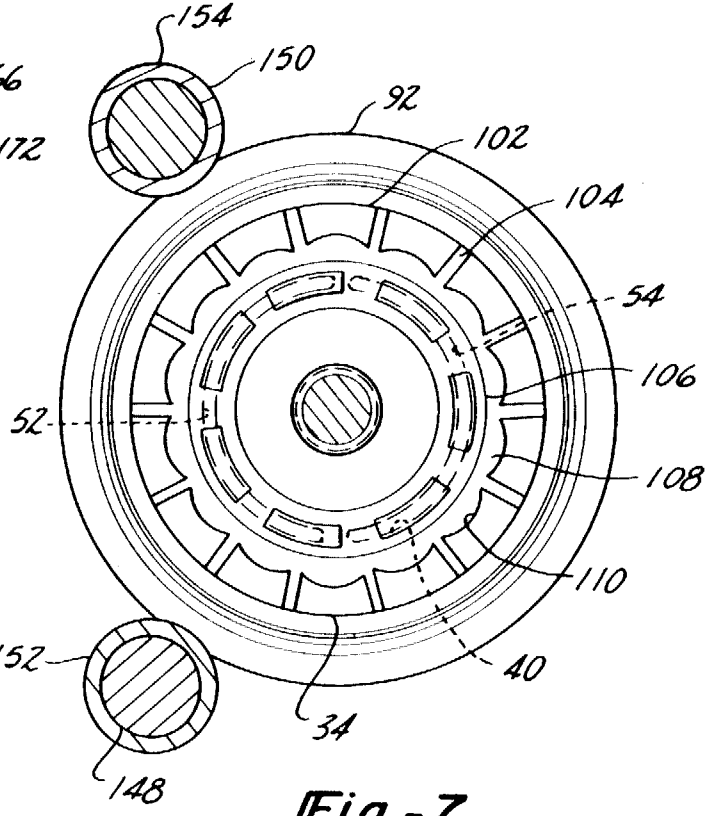
FIG. 7 is a fragmentary, transverse, cross-sectional view of the fluid device illustrated in FIG. 6 and taken on lines 7—7 thereof.

The face 42 of the cylinder barrel 34 which is substantially identical to the configuration illustrated in FIG. 7, comprises a plurality of bearing pads 102, separated from one another by radial grooves 104 and separated from the balancing lands 106 of the cylinder ports 40 by an annular groove 108. The bearing pads 102 are generally referred to as "Kingsbury pads" and function in a manner well known in the art. The bearing pads 102 are further provided with a concave contour on the inner wall 110 facing the cylinder ports 40 to provide a large oil pool to aid in lubricating the bearing pads 102 as the cylinder barrel 34 rotates. The oil pools decrease excessive wear during high temperature and high speed operations, thereby increasing the life of the face 42 of the cylinder block 34.

As can best be seen in FIG. 7, the cylinder ports 40 are arranged in a circle, having a radius equal to the radius of the arcuate ports 52 and 54 (shown in phantom lines in FIG. 7) so that communication will be maintained throughout the full length of the arcuate ports 52 and 54. This communication will be interrupted whenever a cylinder port 40 moves across a cut-off portion or space separating the arcuate ports 52 and 54.

With reference to FIGS. 1 and 2, as the cylinder barrel 34 rotates, a reciprocating stroking motion is imparted to the pistons 38 due to the inclination of the thrust plate assembly 50, thus a relative reciprocating motion between the cylinder barrel 34 and the pistons 38 results as the cylinder barrel 34 rotates wherein the cylinder bores 36 are alternately compressed and expanded, resulting in fluid being drawn into and expelled from the cylinder bores 36 through the cylinder ports 40.

From the foregoing it can be seen that when a rotary movement is imparted to the outer end 112 of the drive shaft 68, the cylinder barrel 34 will be revolved to alternately register the cylinder bores 36 with the arcuate ports 52 and 54 of the valving face 48 by means of the cylinder ports 40.

Referring to FIGS. 1-5 for an understanding of the accompanying description of the thrust plate assembly 50 which comprises a movable yoke 55 and a fixed yoke support 57. The fixed yoke support 57 has a U-shaped configuration, the bottom wall 59 of which has an bore 61 through which the drive shaft 68 extends. The bore 61 has an end enlarged portion 63 having an inner diameter closely fitting the outer diameter of the drive shaft support bearing 72, and thus as can best be seen in FIG. 1 the yoke support 57 is axially aligned with respect to the drive shaft 68 when positioned on the outer periphery of the bearing 72.

The yoke support 57 includes a pair of axially projecting sidewalls 65, each of which has arcuately shaped bearing surface 67 supporting the movable yoke 55 on which the piston shoes 46 slidably engage as the cylinder barrel 34 is rotated so as to impart a reciprocal stroking movement to the pistons 38. The yoke 55 has a pair of transversely extending aligned support pins 69 and 71 each of which has arcuately shaped bearing surfaces 73 contoured to meet with the arcuately shaped bearing surfaces 67 of the projecting sidewalls 65 such that the yoke 55 is adapted to pivot within the side wall bearing surfaces 67 about a axis 75 defined by the radius of the transversely extending support pins 69 and 71 in a manner which will be described in greater detail hereinafter.

The yoke support pin 71 includes a L-shaped arm 77 integrally formed therewith and projecting rearwardly away from the support pin 71. The projecting leg of the arm 77 carries a member 79 (FIGS. 1 and 2) having a slot 81 in which a connecting pin 83 is disposed. The connecting pin 83 extends through an opening 85 formed in a sidewall of the body section 14 and is adapted to be coupled to any one of several displacement varying mechanisms such as the types disclosed in the aforementioned patent application. The opening 85 is so sized as to permit the member 79 to be positioned therethrough onto the arm 77 during assembly with the connecting pin 83 extending through the housing body section 14 and adapted to pivot about the axis 75 defined by the radius of the support pins 69 and 71 without interference with the sidewall of the housing bore 85 14. As can best be seen in FIG. 2, the preferred axis of rotation for the connecting pin 83 and for purposes of description the longitudinal axis of the support pins 69 and 71, is the axis 75 passing through the center point about which each of the arcuate bearing surfaces 73 is formed. The axis 75 should intersect the plane at which the centers of the spherical piston ends 44 lie and may also intersect the longitudinal axis of the drive shaft 68. However, the axis 75 may be vertically offset from the drive shaft axis, in a well known manner, depending upon the desired results.

The arcuately shaped bearing surfaces 67 formed on the sidewalls of the yoke support 57 are in the form of a plastic bearing 87, such as a teflon-lead bearing or the like, which provides the necessary support to withstand the load transmitted through the pistons 38 and the movable yoke 55, while at the same time offering the least amount of frictional resistance to the pivotal movement of the yoke 55 therewithin. The plastic bearings 87 have a central aperture 89 (FIG. 5) adapted to receive a boss 91 formed in each sidewall 65 to securely retain the bearing 87 on its associated sidewall 65.

The yoke 55 has a circular thrust bearing face 93 with which the shoes 46 cooperate and a hemispherical cross section 95 (FIS. 5) with an elliptical, centrally disposed bore 97 through which the drive shaft 68 extends. The elliptical shape of the bore 97 permits the yoke 55 to rotate about the shaft 68 without interference therewith. Since the yoke 55 and the yoke support 57 are both constructed of a sintered material, the radial thickness 99 (FIG. 5) of support pins 69 and 71, as measured from the bearing face 93 to the bottom of the support pin bearing surface 73 must be at least 40% of the total thickness or longitudinal 101 of the yoke 55 as measured from the bearing face 93 to the bottom thereof to assure that the yoke 55 will withstand the loads to which it is subjected, while the L-shaped arm 77 extending from the support pin 71 should have a length which is at least equal to the yoke thickness 101 in order to provide good fill characteristics when the same is manufactured.

The amount of friction between the bearing surfaces of the yoke 55 and the yoke support 57 will be directly proportional to the load exerted thereon, while the frictional torque is in direct proportion to the radius of the arcuate bearing surfaces or 73. In the present design the radius of the bearing surfaces is kept to a minimum, and thus the frictional torque minimized. It should also be noted that present construction of the yoke 55 and the yoke support 57 results in the length 103 and the thickness 101 of the yoke 55 being respectively shorter and greater than comparable components of presently used devices. The shorter length and increased thickness of the yoke 55 reduces unit vibrations and results in an extremely quiet pump compared to such presently used designs.

Figure 3:
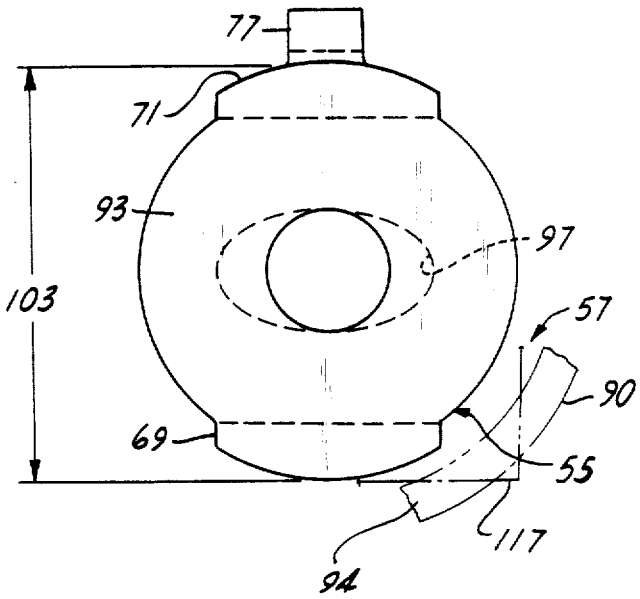
FIG. 3 is a fragmentary transverse cross sectional view of the fluid device of FIG. 1 and illustrating a component thereof and taken generally on line 3—3 of FIG. 2.
Figure 4:
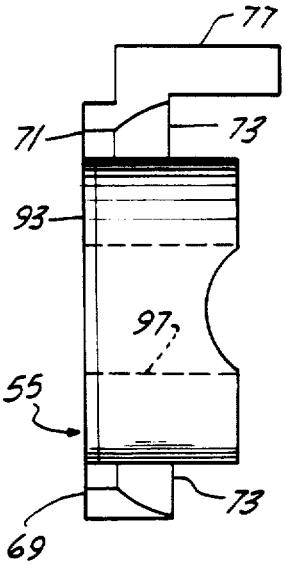
FIG. 4 is a side view of the component illustrated in FIG. 3.

Since the periphery of the yoke support 57 is rectangular and the periphery of the yoke 55 is circular, each corner 117 of the yoke support 57 will project radially outwardly beyond the yoke 55 as illustrated in FIG. 3 in phantom lines. As can best be seen in FIG. 2, the bearing 90 is axially positioned with respect to the center of each piston ball 44 by the abutment of the thrust plate facing side 94 of outer race 92 against the corners 117 of the yoke support 57. This arrangement provides a simple construction which insures proper axial alignment, which is essential for a smooth, efficient and accurate operation of the pump 10.

Figure 6:
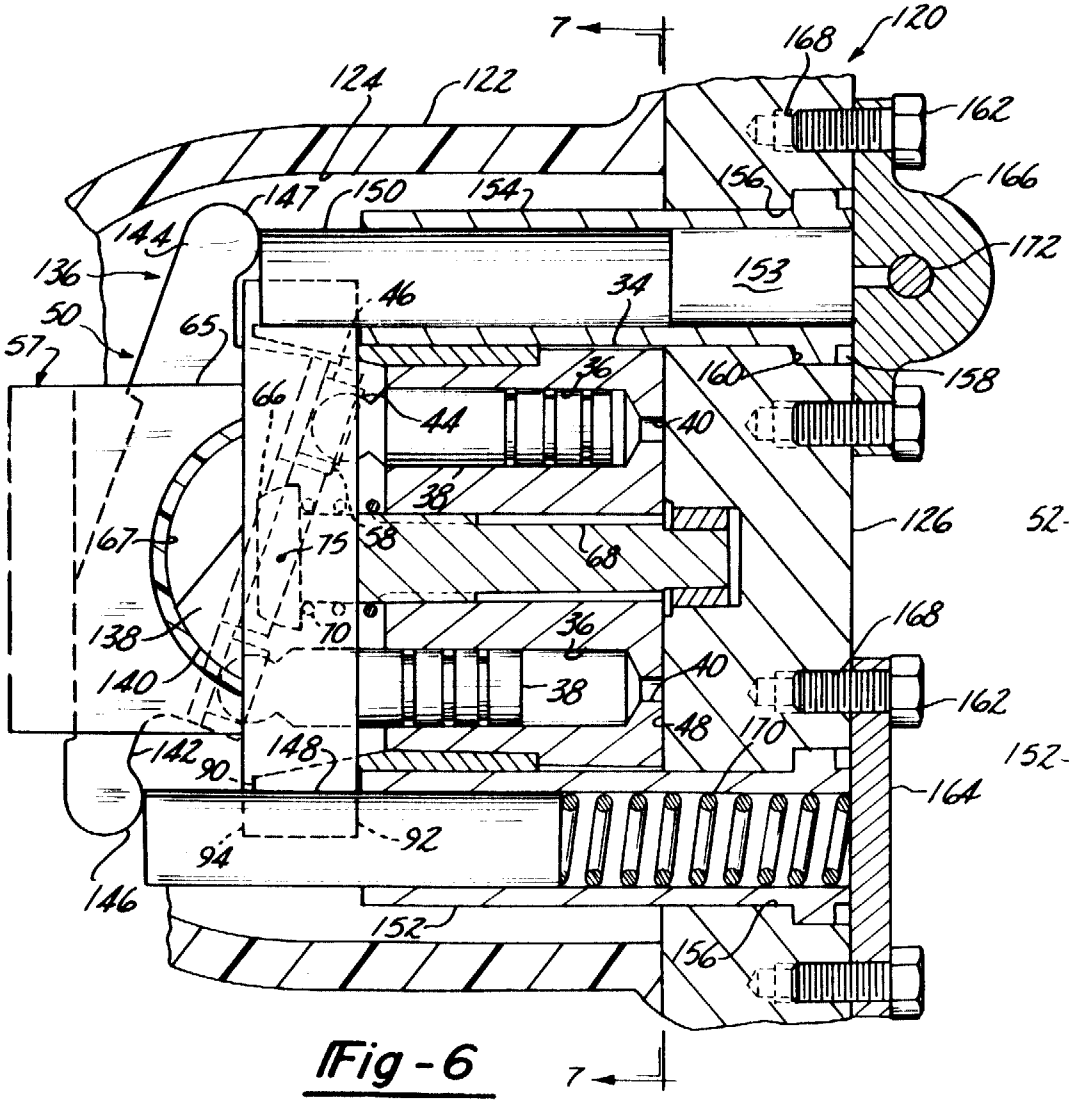
FIG. 6 is a fragmentary cross sectional view of a fluid device incorporating another feature of the present invention.

Referring now to FIGS. 6 and 7 wherein there is illustrated a modification of the present invention in the form of a variable displacement axial piston pump 120 comprising a housing 122 having an internal bore 124 enclosed by a cap 126 by means of screws (not shown) extending through the cap 126 and into threaded bores within the housing 122, the pump 120 is similar to the pump 10 disclosed in FIGS. 1 and 2 in that it is provided with a drive shaft 68 on which a cylinder barrel 34 is rotatably mounted and having a plurality of parallel cylinder bores 36 and cylinder ports 40 through which fluid communication to arcuate passageways 52 and 54 (FIG. 7) in the valving face 48 formed on the inner face of the cap 126 for directing fluid from an inlet port (not shown) to an outlet port (not shown). Radial support for the cylinder barrel 34 is provided by roller bearings 90 in the same manner as described hereinbefore. Each of the cylinder bores 36 has a piston 38 reciprocably mounted therein with the pistons 38, in turn, having rounded ends 44 on which piston shoes 46 are positioned against a thrust plate assembly 50 by means of the contact cage 58, the collar 66 and spring 70 in a manner substantially identical as hereinbefore described.

The thrust plate assembly 50 comprises the fixed yoke support 57 carried on the inner wall of the housing 122 by bearing 75 and includes a pair of axially projecting sidewalls 65, each of which has an arcuately shaped bearing surface 67 supporting a movable yoke 136 on which the piston shoes 46 slidably engage as the cylinder barrel 34 is rotated so as to impart a reciprocal stroking movement to the pistons 38. The yoke 136 has a pair of transversely extending, aligned support pins 138, each having arcuately shaped bearing surfaces 140 contoured to mate with the arcuately shaped bearing surfaces 67 of the projecting sidewalls 65, such that the yoke 136 is adapted to pivot within the sidewall bearing surfaces 67 about the axes 75 of the transversely extending support pins 138 (only one of which is shown in FIG. 6). The yoke 136 includes a pair of transverse arms 142 and 144 which project in a plane perpendicular to the support pins 138 and have rounded bearing surfaces 146 and 147 at their projecting ends which respectively cooperate with a pair of pistons 148 and 150 to rotate the yoke 136 within the bearing surface 67 in a manner which will be described in greater detail hereinafter.

The pistons 148 and 150 are slidably mounted for reciprocal movement, respectively, within sleeve members 152 and 154 which, in turn, are carried within stepped bores 156 in the cap 126. Each sleeve member 152 and 154 has an enlarged end portion 158 which abuts a step 160 within bores 156, and is secured to the cap 126 by screws 162 extending through cover plates 164 and 166 into threaded bores 168 within the cap 126. The inner ends of each sleeve member 152 and 154 abuts one side of the outer race 92 of the roller bearings 90 to maintain the opposite side 94 of the outer race 92 in abutment with the corner 117 formed on the yoke support 57 in the same manner hereinbefore described with respect to the pump 10. As can best be seen in FIGS. 6 and 7, the sleeve members 152 and 154 have a sufficient radial thickness such that the pistons 148 and 150 will traverse the outer surface of the outer race 92 without interference therewith.

The sleeve member 152 has a spring 170 in compression between the cover plate 164 and the piston 148 biasing the piston 148 to engage the round bearing surface 146 of the arm 142 and rotate the yoke 136 so as to stroke the yoke 136 to a full displacement position, that is, the yoke is at an angle with respect to the longitudinal axis of the drive shaft 68 that permits the greatest degree of relative reciprocal stroking movement between the pistons 38 and the cylinder bores 36.

The interior 153 of the sleeve member 154 is adapted to be communicated to a source of pressure through a pressure compensated valve 172 or the like, which selectively controls the pressure admitted to the interior of the sleeve member 154 to move the piston 150 against the bearing surface 147 of the arm 144 to selectively position the yoke for controlling the inclination of the thrust plate with respect to the longitudinal axis of the drive shaft 68. Thus, the displacement of the pump 10 may be varied to provide any desired output from a minimum output to a maximum output.

The cylinder barrel 34, the piston shoes 46, the yoke 136 and the yoke support 57 are all constructed of a sintered metal which, in addition to reducing the weight of the pump 120, increases the lubricating characteristics of the rotating components and results in a fluid device which is substantially less expensive to manufacture than fluid devices previously used.

The plastic housing illustrated in FIG. 2 has an outer annular recessed portion 270 at the drive shaft end thereof on which the elongated metal clamps 15 are carried. By tightening the bolts 22 within threaded bore 280 in the clamps 15, the plastic body section 14 may be precompressed to a predetermined amount, which is a function of the pressure at which the pump 10 will operate. During operation of the pump 10, the pressure within each cylinder bore 36 generates a force against each piston 38 which acts in a direction normal to the face of the cylinder barrel 34. This force can be resolved in an axial component force and a radial component force acting at the center of the spherical piston ends 44. These forces tend to exert a load on the plastic body section 14 of the housing 12 which tends to longitudinally expand the same. By precompressing the plastic body section 14 by a predetermined amount, the effect of the expansion loads exerted on the plastic body section 14 by internal forces of the rotating group 33 will be cancelled.

Thus, it can be seen that the present invention has provided a rugged, compact and low cost fluid device of the axial piston type that can function as a motor or a pump and which has an improved means for mounting the cylinder barrel and for varying the displacement thereof.

While the forms of the embodiments of the invention as disclosed herewithin constitute a preferred form, it is to be understood that other forms might be adopted, all coming within the spirit of the invention and the scope of the appended claims.

What is claimed is as follows:

1. [A] *In a* fluid pressure energy translating device of the axial piston type, comprising: a housing [;] *having a longitudinal bore, a shaft mounted in said bore;* a cylinder barrel rotatably mounted within said housing, said cylinder barrel having a plurality of arcuately spaced cylinder bores and cylinder ports communicating each of said cylinder bores with one end of said cylinder barrel; a plurality of pistons with inner ends disposed for reciprocal stroking movement within said cylinder bores; a valve face having arcuate passages; said valve face and said one end of said cylinder barrel being disposed for relative rotary movement with said cylinder ports communicating successively with said arcuate passages in said valve face; thrust plate means comprising a yoke support fixedly mounted in said housing and a yoke movably supported by said yoke support, said yoke being in a driving relationship with the other ends of said pistons for imparting said reciprocal stroking movement to said pistons within said cylinder barrel bores as said cylinder barrel rotates; bearing means having an outer race carried within said housing, an inner race carried around a portion of the peripheral surfaces of said cylinder barrel, said bearing means providing radial support for said cylinder barrel, [said bearing means being in contact with said yoke support at a plurality of circumferentially spaced locations for properly locating said cylinder barrel with respect to said yoke;] said outer race being carried by said housing concentric with said [housing bore;] *longitudinal bore; and means for varying the inclination of said yoke relative to the axes of said pistons; and wherein said outer race of said bearing means is in contact with said yoke support at a plurality of circumferentially spaced locations for properly locating said cylinder barrel with respect to said yoke; and* said means for varying the inclination of said yoke [comprising] *comprises* a pair of sleeve members *fixedly mounted in said housing,* each *of said sleeve members being* disposed along an axis paralleling the axis of said shaft and radially outwardly spaced from the peripheral surface of said cylinder barrel, each of said sleeve members having one end of a piston member reciprocably mounted therein, the other ends of said piston members adapted to abut a portion of said yoke to pivot said yoke, *the improvement comprising* said sleeve members being radially spaced a distance from the centerline of said shaft axis [to abut] *such that one end of each sleeve member axially abuts* the outer race of said bearing means at locations which are between said cylinder barrel and said sleeve members to maintain said *outer* bearing [races] *race* in abutment with said yoke support, said piston members carried within said sleeves being so spaced from said longitudinal axis of said shaft to freely reciprocate in a spaced relationship from the outer periphery of said outer race.

2. [The fluid pressure energy translating device] *The invention* defined in claim 1 further comprising a plurality of roller bearings disposed between said inner and outer races, the yoke facing ends of said roller bearings and said inner race being substantially flush; a portion of said inner race extending beyond said other end of said cylinder barrel and having an annular inclined inner surface flared upwardly from said other cylinder barrel end and toward said yoke facing end of said inner race.

3. [A] *In a* fluid pressure energy translating device of the axial piston type, comprising: a housing having a longitudinal bore; first bearing means mounted in said bore; a shaft rotatably supported by said bearing means; a cylinder barrel drivingly connected to and rotatable with said shaft, said cylinder barrel having a plurality of arcuately spaced cylinder bores and cylinder ports communicating each of said cylinder bores with one end of said cylinder barrel; a plurality of pistons with inner ends disposed for reciprocal stroking movement within said cylinder bores; a valve face *fixed to said housing and* having arcuate passages; said valve face and said one end of said cylinder barrel being disposed for relative rotary movement with said cylinder ports communicating successively with said arcuate passages in said valve face, said first bearing means being spaced from said cylinder barrel a fixed distance; thrust plate means comprising a U-shaped yoke support journalled on said first bearing means and in *axially separable* abutment with said housing, said yoke support having *four* longitudinally extending and laterally spaced legs defining concave bearings [therein between and corners at the extended ends of said yoke support legs,] *therebetween* a movable yoke having correspondingly shaped bearing surfaces mating with said yoke support bearing surfaces, such that said yoke is movably supported by said yoke support; said yoke being in a driving relationship with the other ends of said pistons for imparting said reciprocal stroking movement to said pistons within said cylinder barrel bores as said cylinder barrel rotates; second bearing means having an outer race carried around a portion of the peripheral surfaces of said cylinder barrel, said second bearing means providing radial support for said cylinder barrel [,] *while accommodating slight axial shifting movement of said barrel in either direction relative to said outer race, and spring means biasing said barrel axially against said valve face; and means defining corner surfaces at the extended ends of each of said yoke support legs, said corner surfaces lying in a common general plane, the improvement wherein* the four [corners] *corner surfaces* of the yoke support defined [by] *at* said extended ends providing abutments to [support] *axially engage* said second bearing means at circumferentially spaced locations on said

*outer race of* second bearing means [for properly locating] *to radially locate* said cylinder barrel with respect to said yoke[.] *while axially locating said outer race with respect to said yoke and to maintain said yoke support in axial abutment with said housing, and means engageable with the outer race of said second bearing means and detachably mounted on said housing for axially locating said outer race of second bearing means relative to said housing.*

4. The [fluid pressure energy translating device] *invention* defined in claim 3 further comprising a plurality of roller bearings disposed between said inner and outer races, the yoke facing end of said roller bearings and said inner race being substantially flush, a portion of said inner race extending beyond the other end of said cylinder barrel and having an annularly inclined inner surface flared upwardly from said other cylinder barrel end and toward said yoke facing end of *said other cylinder barrel end and toward said yoke facing end of* said inner race.

5. The [fluid pressure energy translating device] *invention* defined in claim 3, further comprising: means for varying the inclination of said yoke with respect to the longitudinal axis of said shaft for selectively varying the amount of reciprocal stroking movement imparted to said pistons within said cylinder barrel bores.

6. [A] *In a* fluid pressure energy translating device of the axial piston type comprising:

a housing *having a longitudinal bore;* a cylinder barrel rotatably mounted within said housing, said cylinder barrel having a plurality of arcuately spaced cylinder bores and cylinder ports communicating each of said cylinder bores with one end of said cylinder barrel;

a plurality of pistons with inner ends disposed for reciprocal stroking movement within said cylinder bores;

a valve face having arcuate passages, said valve face and said one end of said cylinder barrel being disposed for relative rotary movement, with said cylinder ports communicating successively with said arcuate passages in said valve face;

an inclined thrust plate comprising a yoke support fixedly mounted in said housing and a yoke movably supported by said yoke support, said yoke being in a driving relationship with the other end of said piston for imparting a reciprocal stroking movement to said pistons within said cylinder barrel as said cylinder barrel rotates;

means for varying the inclination of said yoke with respect to the longitudinal axis of rotation of said cylinder barrel for selectively varying the amount of reciprocal stroking movement imparted to said pistons as said cylinder barrel rotates;

bearing means having an outer race carried by said housing concentric with said housing bore;

an inner race carried around a portion of the peripheral surface of said cylinder barrel;

a plurality of roller bearings disposed between said inner and outer races;

*the improvement wherein* said means for varying the inclination of said yoke [comprising] *comprises* a pair of spaced sleeve members, each *of said sleeve members being fixedly mounted on said housing and* disposed along an axis parallel to the axis of rotation of said cylinder barrel and radially outwardly spaced from the peripheral surface of said cylinder barrel, each of said sleeve members having one end of a piston reciprocably mounted therein, the other end of said pistons adapted to abut a portion of said yoke to pivot said yoke about an axis transversely disposed with respect to the axis of rotation of said cylinder barrel *the improvement comprising,* said sleeves being radially spaced a distance from the axis of rotation of said cylinder barrel [to abut] *such that one end of each sleeve member axially abuts* the outer race of said bearing means at locations which are between said cylinder barrel and said sleeve members to maintain said outer race in contact with said yoke support at a plurality of circumferentially spaced locations for properly locating said cylinder barrel with respect to said yoke, said piston members being carried within said sleeves and so spaced from said axis of rotation of said cylinder barrel as to freely reciprocate in a spaced relationship with respect to the outer periphery of said outer race.

* * * * *

UNITED STATES PATENT AND TRADEMARK OFFICE

CERTIFICATE OF CORRECTION

PATENT NO. : RE 32,373

DATED : March 17, 1987

INVENTOR(S) : Wilfred S. Bobier

It is certified that error appears in the above-identified patent and that said Letters Patent is hereby corrected as shown below:

At column 11, line 1, after "of" insert --said--.

At column 11, line 2, before "to" insert --to enable said second bearing means--.

Signed and Sealed this

Fourteenth Day of June, 1988

*Attest:*

*Attesting Officer*

DONALD J. QUIGG

*Commissioner of Patents and Trademarks*